US008929880B2

(12) United States Patent
Ratasuk et al.

(10) Patent No.: US 8,929,880 B2
(45) Date of Patent: Jan. 6, 2015

(54) UPLINK INTERFERENCE MANAGEMENT FOR A HETEROGENEOUS WIRELESS NETWORK

(75) Inventors: Rapeepat Ratasuk, Hoffman Estates, IL (US); Amitabha Ghosh, Buffalo Grove, IL (US); Weidong Yang, Hoffman Estates, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 459 days.

(21) Appl. No.: 13/092,057

(22) Filed: Apr. 21, 2011

(65) Prior Publication Data
US 2012/0270536 A1 Oct. 25, 2012

(51) Int. Cl.
H04W 24/00 (2009.01)
H04W 52/24 (2009.01)
H04W 52/14 (2009.01)
H04W 52/28 (2009.01)
H04L 1/00 (2006.01)

(52) U.S. Cl.
CPC .......... *H04W 52/244* (2013.01); *H04W 52/146* (2013.01); *H04W 52/283* (2013.01); *H04L 1/0025* (2013.01); *Y02B 60/50* (2013.01)
USPC ........................................ 455/422.1; 455/423

(58) Field of Classification Search
USPC ............ 455/422.1, 423, 450, 452.1, 453, 522
See application file for complete search history.

(56) References Cited

U.S. PATENT DOCUMENTS

| 5,594,946 | A | 1/1997 | Menich et al. |
| 2007/0178930 | A1 | 8/2007 | Xiao et al. |
| 2007/0197254 | A1* | 8/2007 | Borran et al. ................. 455/522 |
| 2008/0220791 | A1* | 9/2008 | Cho et al. ....................... 455/450 |
| 2009/0196174 | A1* | 8/2009 | Ji ................................ 370/230.1 |
| 2009/0286545 | A1* | 11/2009 | Yavuz et al. ............... 455/452.1 |
| 2010/0008295 | A1 | 1/2010 | Ji et al. |
| 2010/0009710 | A1 | 1/2010 | Zhang et al. |

(Continued)

FOREIGN PATENT DOCUMENTS

| WO | 2009158544 A2 | 12/2009 |
| WO | 2010036188 A1 | 4/2010 |
| WO | 2010085055 A2 | 11/2010 |

OTHER PUBLICATIONS

International Search Report and Written Opinion for International Patent Application No. PCT/US2012/030953 mailed on Jul. 2, 2012.

(Continued)

*Primary Examiner* — Myron K Wyche
(74) *Attorney, Agent, or Firm* — Steven A. May

(57) ABSTRACT

User equipment (UE), referred to herein as an interfering UE (130), can be detected that is proximate to a low-power cell (120), such as a micro-cell, pico-cell, femto-cell, a relay, or the like. The interfering UE (130) can be transmitting to the base station (110) at a power level that is producing high interference affecting uplink performance between a different UE and the low-power cell (120). A power adjustment message (140) can be generated at the base station (110). The power adjustment message (140) can be conveyed (156) from the base station (110) to the interfering UE (130). The power level adjustment message (130) can cause the interfering UE (130) to lower its transmission power (164), which reduces the high interference, thereby improving uplink performance between the different UE and the low-power cell (120).

19 Claims, 2 Drawing Sheets

(56) References Cited

U.S. PATENT DOCUMENTS

2010/0039948 A1* 2/2010 Agrawal et al. ............... 370/252
2010/0056197 A1   3/2010 Attar et al.
2010/0113060 A1* 5/2010 Bai et al. ........................ 455/453
2011/0177806 A1* 7/2011 Kazmi et al. ............... 455/422.1
2011/0237244 A1* 9/2011 Hiltunen et al. .............. 455/423
2012/0129536 A1* 5/2012 Zou et al. ...................... 455/444

OTHER PUBLICATIONS

3rd Generation Partnership Project; Technical Specification Group Radio Access Network; Evolved Universal Terrestrial Radio Access (E-UTRA); Physical layer procedures (Release 10)—3GPP TS 36.213—vol. 10.1.0—Mar. 2011—pp. 1-20.

* cited by examiner

UPLINK INTERFERENCE MANAGEMENT FOR A HETEROGENEOUS WIRELESS NETWORK

FIELD OF THE INVENTION

The invention generally relates to uplink interference management for a mobile telephony network.

BACKGROUND

Within a cellular environment, elements such as mobile phones and base stations communicate with each other to transmit and receive voice and/or data. Base stations can provide communication with other networks (e.g., Internet, carrier network) and/or other mobile phones. For example, a Long Term Evolution (LTE) wireless network can provide mobile phone service for a neighborhood. Communication within a cellular environment requires radio propagation to and from mobile phones and base stations. In many instances, base stations (e.g., macro-cells) can become overburdened as mobile phone density grows within an area. That is, the base station can become unable to service mobile phone requests. To alleviate the overload, low-power nodes (e.g. micro-cells, pico-cells, femto-cells, relays, etc.) can often be deployed to reside within the coverage area of the base station. For example, a pico-cell serving the interior of a building can provide additional capacity to a base station coverage area.

In heterogeneous network, a mixture of macro (e.g., standard base station of a mobile telephony network) and low-power nodes (e.g. micro-cells, pico-cells, femto-cells, relays, etc.) can be deployed. Frequently, a mobile phone can select a macro-cell based on signal strength of the macro-cell due to the cell's high transmit power and/or antenna gain. For example, macro-cell often operates at a 25-30 dB gain in downlink signal strength compared to a low-power node. Consequently, a macro-cell can be selected over low-power node, although the path loss (e.g., signal attenuation) from the low-power node can be lower resulting in a stronger signal (e.g., better connection).

When connected to a macro-cell, a mobile phone can set the uplink transmit power according to the path loss to the macro-cell. As a result, mobile phones proximate to a low-power node can transmit at high power due to the high path loss. This can create significant interference to the low-power node which can lower low-power node throughput significantly. Interference affecting a low-power node can result in reduced signal and/or service capability of the low-power node. Low-power node interference can result in imbalanced network load and inefficient use of network resources (e.g., continuously unused low-power nodes).

SUMMARY

One embodiment of the disclosure is for a method for managing interference from user equipment (UE) transmissions in a mobile telephony network. In the method, user equipment (UE), referred to herein as an interfering UE, can be detected that is connected to the base station that is proximate to a low-power cell. The interfering UE can transmit (e.g., uplink) to the base station at a power level that is producing high interference affecting uplink performance between a different UE and the low-power cell. A power adjustment message can be generated at the base station, which is conveyed from the base station to the interfering UE. The power level adjustment message can causes the interfering UE to lower its transmission power, which reduces the high interference, thereby improving uplink performance between the different UE and the low-power cell.

One embodiment of the disclosure is for a method for managing interference from user equipment (UE) transmissions in a mobile telephony network. In the method, data can be gathered at a base station of a mobile telephony network. The data can be from a set of user equipment (UE) in range of the base station. The mobile telephony network can include at least one low-power cell having a cell range that overlaps a station range of the base station. A subset of the user equipment (UE) can transmit data to the low-power cell when within the cell range at a cell transmission power. The subset of user equipment (UE) can transmit data directly to the base station at a default station transmission power when within the station range and when outside an interference region. The cell range can be included within a periphery of the interference region. The base station can use the gathered data to detect that one of the user equipment (EU), referred to as the interfering UE, is within the interference region, is outside the cell range, and is transmitting to the base station at the default station transmission power. A power adjustment message can be conveyed from the base station to the interfering UE. The power adjustment message can request the interfering UE to lower its transmission power from the default station transmission power to a lower power level.

The methods described above can be implemented as a computer program products stored on a storage medium that are able to be executed on a processor, in contemplated embodiments. In other contemplated embodiments, the methods can be implemented by an apparatus or a system having the inventive arrangements detailed herein.

DETAILED DESCRIPTION OF THE INVENTION

Figure 1:
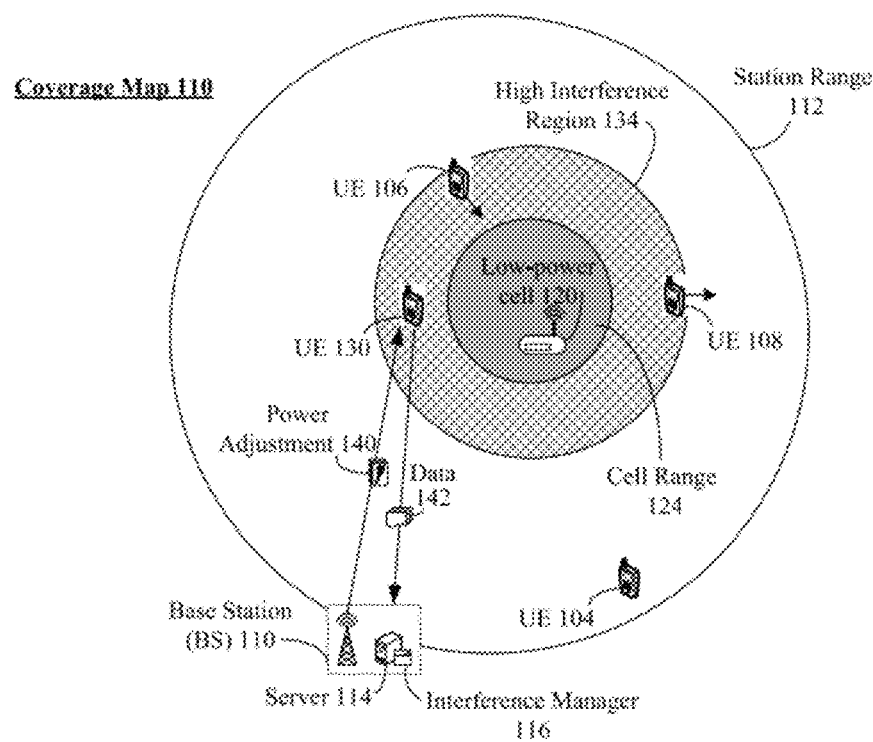
FIG. 1 is a block diagram illustrating a scenario for uplink interference management for a heterogeneous mobile telephony network in accordance with an embodiment of the inventive arrangements disclosed herein.
Figure 1:
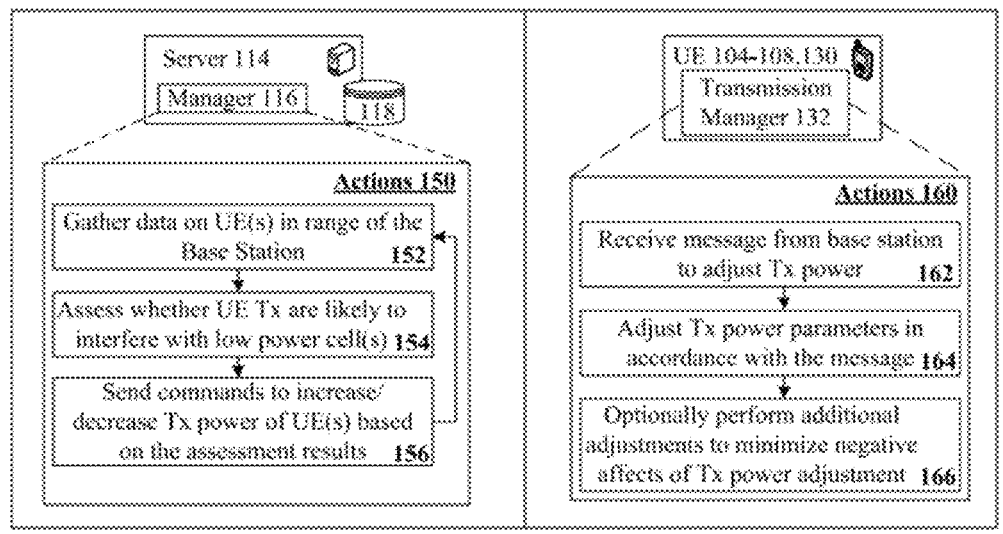

In one embodiment, a base station can detect one or more mobile wireless devices that are causing uplink interference with a low-power cell, such as micro-cells, pico-cells, femto-cells, relays, etc. That is, the mobile wireless device (also referred to as user equipment, UE, or an interfering UE) is transmitting a relatively high power while the interfering UE is close enough to the low-power cell to cause interference with a different UE's uplink to the low-power cell. The base station can send a command to the interfering UE, which causes the UE to change its transmission characteristics. These changed transmission characteristics reduces the interference.

The base station can also detect when the interfering UE leaves a zone (e.g., a high interference region) where it is likely to cause interference with the low-power cell. This causes the base station to issue a command (e.g., a second command) to the interfering UE. When the interfering UE receives this second command, it adjusts its transmission power characteristics to a normal, higher-power state, as this normal transmission state will no longer cause significant interference with the low-power cell.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible or non-transitory medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a block diagram showing a coverage map 110 for a heterogeneous mobile telephony network that manages interference between user equipment (UE) 130 transmissions and low-power cell 120 communications in accordance with an embodiment of the inventive arrangements disclosed herein.

Specifically, the coverage map 110 shows a base station (BS) 110 that provides a coverage region referred to as a station range 112. Within the station range 112, multiple devices can wirelessly communicate with the base station 110, such as UE 104, 106, 108, and 130 as well as low-power cell 120. The low-power cell 120 also has a coverage region referred to as a cell range 124, which overlaps with station range 112. Often, the low-power cell 120 can be used to reduce the load on the base station 110, as mobile devices within the coverage region of the low-power cell 124 can uplink to and downlink from the low-power cell 120 instead of communicating directly with the base station 110. Thus, the low-power cell 120 functions as a communication intermediary for the base station 110. Hence, low-power cells, such as cell 120, can alleviate capacity concerns of the mobile telephony network and can be a useful mechanism for capacity scaling of a mobile telephony network.

A high interference region 134 can exist outside the cell range 124, where the cell range 124 is within the periphery of the high interference region 134. Within region 134, UE (e.g., UE 106, 108, 130) are still communicating directly with the base station 110. Uplink communications from the UE to the base station 110 can occur at a power level referred to as a default station transmission power. In contrast, uplink communications from UE in cell range 124 can occur at a power level referred to as a cell transmission power, which is less than the default station transmission power. The interference within region 134 can be from UE transmissions occurring at the default station transmission power affecting the uplink performance of another UE occurring at the cell transmission power. That is, UE within the cell range 124 will transmit at lower power (since that UE is transmitting to the low-power cell 120 and not to the base station 110) than UE outside the cell region 124, which is communicating directly with the base station 110.

It should be emphasized that the interference being managed herein, is uplink interference caused by UE transmissions, as opposed to being interferences with low-power cell 120 or base station 110 transmissions. It should also be noted that this type of transmission interference is part of a dynamic system, as UEs are continuously moving relative to each other, which results in continuously changing interference patterns.

An embodiment of the disclosure causes a base station 110 to selectively issue power adjustment commands 140 to UE, such as UE 130. In one embodiment, these power adjustment commands 140 can be dynamically and continuously issued to effectuate suitable adjustments to manage the similarly dynamic interference patterns between UE transmissions. When the UE 130 (or any other UE, such as UE 104, 106, or 108) receives a power adjustment message 140, the UE 130 can adjust transmission characteristics (e.g., a transmission power state) in accordance with message 140 specifics. The adjusted transmission power can result in a power level less than the default station transmission power and greater than the cell transmission power. The adjustment transmission power can be at a level designed to strike a balance between acceptable levels of interference and acceptable levels of connectively between the UE and the base station 110. Transmission power adjustments can be based on an internal factional power control policy of a UE and/or based on an explicit power control policy of the base station 110. Additionally, one or more elements can be used when adjusting transmission power. For example, the power adjustment message 140 can invoke power adjustment in a UE based on an assigned modulation and coding level, a fractional power control parameter, and a target power of a channel used by the adjusting UE.

Further, the transmission power adjustment can be a static or an adaptive adjustment. A static adjustment can be an adjustment to a fixed transmission level irrespective of conditions of the adjusting UE or the mobile telephony network. An adaptive adjustment can be an adjustment that varies based on dynamic conditions known to the base station 110, the adjusting UE, or both. Adaptive adjustments can be based on, for example, an Interference over Thermal (IoT) measurement, a reference signal received power (RSRP) difference between at least two cells, a resource utilization measurement, and the like.

One triggering condition for transmission adjustments can be based on a physical location of UE relative to the high interference region 134. Data 142, such as Global Positioning System (GPS) coordinates, can be conveyed to the base station 110, which is used to determine UE position. Other location methods, such as triangulation based on signal strength can be used for determine UE positions.

Regardless of how UE positions are tracked, when a UE enters the high interference region 134, as shown by UE 106 entering region 134, a base station 110 issued command (e.g., message 140) can indicate that the transmission power state of the UE 106 is to be reduced. When UE leaves the high power interference region 134, as shown by UE 108 leaving region 134, a base station 110 issued command (e.g., command 140) can indicate that a transmission power state of the UE 108 can be increased (i.e., restored to the default station transmission power). Power states of the UE 104-108, 130 can be continuously and dynamically adjusted in response to base station 110 issued messages 140 as the UE 104-108, 130 are moved within the station range 112. Additionally, any number of different power state adjustments can be specified by the power adjustment commands 140, to strike a balance between acceptable levels of interference and acceptable levels of connectively between the UE 104-108, 130 and the base station 110.

The base station 110 can include a server 114, which has hardware components of one or more processors, one or more memories, communication ports, and the like. The server 114 can execute instructions of an interference manager 116. The interference manager 116 can represent software, firmware, and/or electronically encoded logic. Data store 118 can also exist, which can be a storage medium for storing information needed for the operation of the interference manager 116.

When computer program instructions of manager 116 are executed by server 114, a set of actions 150 can be performed. These actions 150 include gathering data 142 on UE(s) (e.g., UE 104-108, 130) within the station range 1112, as shown by step 152. This data 142 can be stored in data store 118. In step 154, the base station can assess whether transmissions from one or more UE are likely to interfere with low power cell communications. In step 156, the base station 110 can send power adjustment commands (e.g., command 140) to increase or decrease transmission power of specific UE(s) based on the assessment results.

Each UE 104-108, 130 of FIG. 1 can include hardware as well as software/firmware to communicate with the base station 110 and/or the low-power cell 120. Each UE 104-108, 130 can include a transmission manager 132, which can be software, firmware, and/or electronically encoded logic, used to change transmission characteristics and/or a transmission power state of the UE 104-108, 130. That is, when computer program instructions of transmission manager 132 are executed by hardware of the UE 104-108, 130, a set of actions 160 can be performed.

These actions 160 can be initiated when a power adjustment message (e.g., message 140) is received from the base station 110, as shown by step 162. The received message 140 can direct the UE 104-108, 130 to adjust transmission power. In step 164, one or more transmission power parameters can be adjusted in accordance with the received message 140. In step 166, additionally adjustments can be optionally performed.

That is, when the transmission power of the UE 104-018, 130 is reduced, (in response to an adjustment command 140) the upload capabilities (e.g., bandwidth) of the UE 104-018, 130 can be proportionally reduced. Similarly, when the transmission power of the UE 104-018, 130 is increased (in response to an adjustment command 140), the upload capabilities (e.g., bandwidth) of the UE 104-018, 130 can be proportionally increased. This decrease/increase in upload ability can affect running processes of the UE 104-108, 130, which can be adjusted adaptively, which is represented by step 166.

For example, when a large data file is being uploaded at a time the transmission power of UE is reduced, an additional and optional adjustment can be to halt and queue the file upload, until the upload speed of the device is increased above a certain threshold (which could occur responsive to another power adjustment command 140 when the UE leaves the high interference region 134).

In one contemplated embodiment, the transmission manager 132 can consider active processes and activities involving transmissions from the UE, before responding to the power adjustment command 140. For example, the transmission manager 132 can delay making an adjustment to the transmission characteristics of the UE until a pending action or process is completed.

As used herein, the mobile telecommunication network of map 110 can include one or more cells communicatively linked to provide communication for UE 104-108, 130. For example, the network can be a Long Term Evolution (LTE) network able to provide cellular service for mobile phones. Cells of the mobile telecommunication network can be macro or low-power cells, where macro cells provide coverage for a larger region (e.g., range 112) than a region (e.g., range 120) covered by low-power cells (e.g., cell 120). Communications to/from macro cells require greater power than communications to/from low-power cells 120. The base station 110 is a macro cell of the network as shown by map 110.

A low-power cell, (e.g., cell 120) can refer to a micro-cell, a femto-cell, a pico-cell, a relay, and the like. A low-power cell 120 can include, but is not limited to, a transceiver, an antenna for bearer and backhaul, a digital signal processor, control electronics, a power source, and the like. Low-power cells 120 can be proximate to one or more UE 104-108, 130, macro-cell, and the like. For example, the low-power cell 120 can be a low powered cellular base station providing cellular service for indoor (e.g. hotel) or outdoor deployment (e.g. street poles).

High interference of region 134 can be an interference occurrence resulting in the reduction of uplink performance in coverage area 124. That is, high interference can be co-channel interference, adjacent channel interference, and the like. For instance, extraneous power from an uplink signal associated with UE 130 (or UE 104-108) can result in poor uplink performance in the low-power cell 120 (e.g., poor uplink performance between UE in region 124 and low-power cell 120). High interference can be continuous, intermittent, and the like. In one embodiment, high interference can be determined utilizing one or more threshold values. Threshold values can be associated with a configuration setting, an operational parameter, and the like. For example, a threshold value can be a gain value of a signal established by an administrator known to result in high interference with a low-power cell 120.

Drawings presented herein are for illustrative purposes only and should not be construed to limit the invention in any regard. Accordingly, a mobile telephony network implementing inventive concepts disclosed herein can include multiple cells, multiple macro-cells within a region, multiple low-power cells in a region, and the like. Network cell organization represented by coverage map 110 can conform to traditional and/or proprietary configurations including, but not limited to, hexagonal areas, square areas, circular areas, and the like. It should be appreciated that network cell organization can include irregular shapes.

Figure 2:
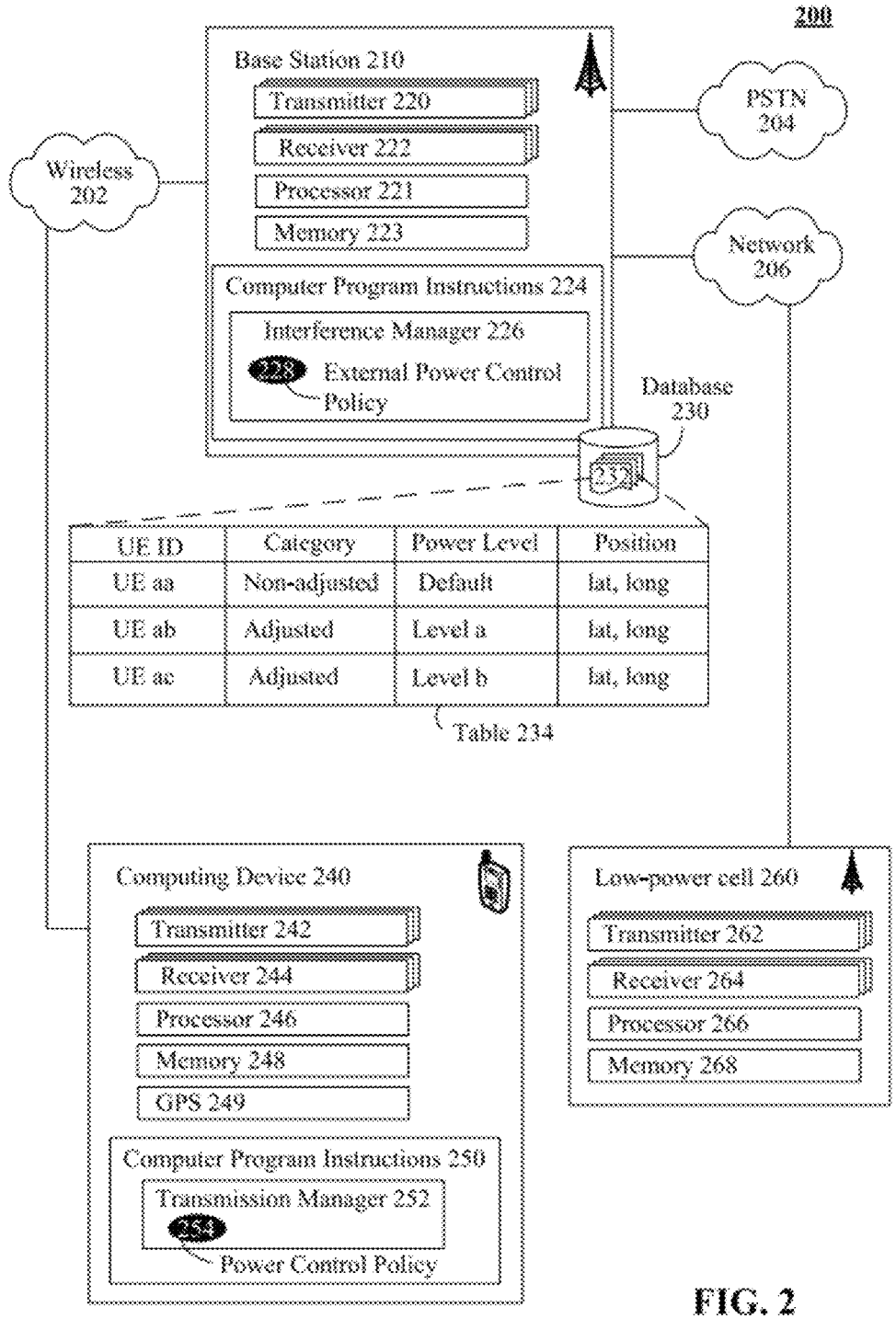
FIG. 2 shows a block diagram of a base station, a mobile device, and a low-power cell in accordance with an embodiment of the inventive arrangements disclosed herein.

FIG. 2 shows a block diagram 200 of a base station 210 and a mobile device 240 in accordance with an embodiment of the inventive arrangements disclosed herein. Components of FIG. 1 can be implemented in accordance with specifics of diagram 200 in one contemplated embodiment.

The base station 210 can include a set of equipment that facilitates wireless communication (over wireless network 202) between UE (e.g., mobile device 240) and a network, such as the public switched telephone network (PSTN) 204 and/or network 206. In various embodiments, the base station 210 can be referred to as a base transceiver station (BTS), a cell site, a radio base station (RBS), node B (in 3G networks), a base station (BS), eNodeB or eNB or enhanced node B (in LTE networks).

The base station 210 can include one or more transmitters 220 and one or more receivers 222. Each transmitter 220 can transmit information from the base station node to the wireless network 202 and/or from the base station node to network 204 and/or network 206. Each receiver 222 can receive information from network 202, 204, and/or 206.

The base station can include a set of computer program instructions 224 that are stored on at least one storage medium and that are able to be executed by one or more processors. The computer program instructions 224 can be implemented within software, firmware, or printed circuitry. Sets of computer program instructions 224 can implement an interference manager 226. The interference manager 224 can process incoming data (e.g., data 142), can determine a set of UE likely to cause high uplink interference, and can generate and convey power adjustment messages (e.g., message 140) to these devices. In one embodiment, the interference manager can utilize an external power control policy 228 to determine which UEs are to receive messages and how the transmission power specified in power adjustment messages is to be adjusted.

The interference manager 226 can operate in different manners depending on implementation choices. For example, in one embodiment, the interference manager can use GPS or other location data from computing devices 240 (e.g., UEs) to determine UE positions and then can send power adjustment messages based on this location. In one embodiment, the interference manager 226 can use location-based services, which may be internally implemented within the base station 210 in a variety of manners, to identify connected users that are in vicinity to the low-power cell 260, yet are still receiving service from the base station 210.

In another embodiment, the interference manager 226 can use handover information to identify connected users that are likely to create high interference to low-power cells 260. In such an embodiment, the interference manager 224 can set up neighbor cell lists with low-power cells 260 and can configure UE to report reference signal received power (RSRP) measurements (within data 142) for those cells. UE whose RSRP measurements are within a parameter (e.g., $\Delta_{int}$) of the server cell, can be identified as high-interference users. In one embodiment (e.g., one in which a network deployment database is not available), a neighbor list 322 can be utilized in conjunction with an overload indicator via an X-2 interface.

In one embodiment, database 230 can be utilized in conjunction with the interference manager 226. In various embodiments, database 230 can include a neighbor cell list, a network deployment database, and the like. The database can also store a set of records 232, such as records indicated in sample table 234. As shown, specific UE devices are tracked. For each UE, a category is maintained that indicates whether the transmission power of the UE has been adjusted or not. A current power level of UE can also be maintained, as well as a geographic position of the UE. Table 234 values can be continuously updated and changed to reflect current conditions of the network.

The wireless network 202 can be used convey digitally encoded information wirelessly between mobile devices in range of the base station 210. In various embodiments, wireless network 202 can conform to a variety of wireless communication technologies, such as Global System for Mobile Communications (GSM), Code division multiple access (CDMA), Wireless local loop (WLL), A wide area network (WAN), WiFi (any of the IEEE 802.11 family of standards), WiMAX (Worldwide Interoperability for Microwave Access), etc. In one embodiment, the wireless network 202 can be 3GPP compliant. In one embodiment, wireless network 202 can include a LTE network.

PSTN network 204 can represent a network of circuit-switched telephone networks. The PSTN 204 can consist of telephone lines, fiber optic cables, microwave transmission links, cellular networks, communications satellites, and undersea telephone cables all inter-connected by switching centers which allows telephones across the world to communicate with each other.

Network 206 can represent a packet switched network. Network 206 can conform to the internet protocol (IP) set of protocols that include a Transmission Control Protocol (TCP) and the Internet Protocol (IP). Network 206 can be public or private. For example network 206 can represent the public internet, a corporate intranet, a virtual private network (VPN), and the like. Data and/or voice (via a Voice Over IP protocol) can be conveyed over network 206.

Device 240 can be referred to as UE, as it includes at least one of a wireless transmitter 242 and wireless receiver 244, which allows the device 240 to connect to wireless network 202. For example, device 240 can be a mobile telephone, two-way radio equipment with cellular capability, a tablet computing device, an e-book reader with cellular capability, a notebook, netbook, an internet device, a navigation device equipped for cellular communication, and the like. Additional (and optional) receivers and/or transmitters can be included in device 240, which may permit device 240 to directly connect to network 204 and/or 206 in a wired or wireless manner in various embodiments.

The device 240 can include one or more processor 246 and one or more memory 248 components. Device can also include a GPS component 249 for reporting location of the device 240 to the base station 210. The set of one or more processors 246 can execute computer program instructions 250 of the device 240. These instructions 250 can represent logic embedded in semiconductor, firmware embedded instructions, and/or software stored on a storage medium of device 240, such as memory 248. Device 240 can optionally include an operating system as well as a set of optional applications.

The computer program instructions 250 can include a transmission manager 252, which adjusts transmission power settings of the device 240. For example, manager 252 can perform actions 164 and/or 166 of FIG. 1. In one embodiment, the transmission manager 252 can use a power control policy 254 when making adjustments. Power adjustments made by transmission manager 252 can be static or variable adjustments.

In one embodiment, thresholds (such as geographic boundaries) can be established (by adjustment messages from the base station 210), which are associated with specific transmission power settings. The transmission manager 252 can detect the occurrence of the trigger event (e.g., a crossing of a boundary) and can perform transmission power level adjustments in response to these events. Thus, the transmission manager 252 can be an event and/or condition driven program, where thresholds and adjustment values are established from power adjustment messages (e.g., message 140).

In another embodiment, power adjustment messages from a base station 210 can include a command to adjust a transmission power setting, which the transmission manager 252 executes in a relatively immediate fashion after receipt of the message. Regardless of specifics, transmission manager 252 includes programmatic instructions for adjusting transmission power of transmitter 242 in accordance with received power adjustment messages.

The low-power cell 270 can be a small base station covering a relatively small area. Low-power cell 270 can include a micro-cell, a femto-cell, a pico-cell, a relay, and the like. Low-power cells 270 transmit and receive at low power settings than those used for base station 210 communications. Low power cells 270 can connect to base station 210 via network 206, where the base station 210 performs radio resource management and hand-over functions. The base station 210 can aggregate data to be passed to a mobile switching center (MSC) and/or to a gateway support node (GGSN). The low-power cell can include, but is not limited to, a transmitter 262, a receiver 264 (or a transceiver), an antenna for bearer and backhaul, a digital signal processor, control electronics including processor 266 and memory 268, a power source, and the like.

The flowchart, block, and pseudo code diagrams in the FIGS. 1-2 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for managing interference from user equipment (UE) transmissions in a mobile telephony network comprising:
   gathering data at a base station of the mobile telephony network from a set of UE in range of the base station, wherein the mobile telephony network comprises at least one low-power cell having a cell range that overlaps a station range of the base station, wherein a subset of the UE transmits data to the low-power cell when within the cell range at a cell transmission power, wherein the subset of UE transmits data directly to the base station at a default station transmission power when within the station range and when outside an interference region, wherein the cell range is included within a periphery of the interference region, wherein the cell transmission power is less than the default station transmission power;
   detecting at the base station using the data that one of the user equipment (UE), referred to herein as an interfering UE is within the interference region, is outside the cell range, and that the transmissions of the interfering UE to the base station at the default station transmission power is producing high interference affecting uplink performance between a different UE and the low-power cell;
   in response to detecting, generating at the base station a power adjustment message; and
   conveying the power adjustment message from the base station to the interfering UE, wherein the power adjustment message causes the interfering UE to lower its transmission power from the default station transmission power to a lower power level.

2. The method of claim 1, wherein said low-power cell is one of a micro-cell, pico-cell, or femto-cell.

3. The method of claim 1, further comprising:
   receiving at the base station, global positioning system (GPS) coordinates of UE within a station range of the base station; and
   detecting using the GPS coordinates that the interfering UE crosses a boundary of an interference region, wherein the crossing of the UE boundary causes the base station to generate and convey the power adjustment message to the interfering UE.

4. The method of claim 1, further comprising, wherein the power adjustment message is used for adjusting is at least one of an internal fractional power control policy of the interfering UE and an explicit power control policy of the base station.

5. The method of claim 1, wherein the power adjustment message invokes power adjustment in the interfering UE based on an assigned modulation and coding level, a fractional power control parameter, and a target power of a channel used by the interfering UE.

6. The method of claim 1, wherein the base station maintains a power control policy for UE in range of the base station, wherein the power control policy maintains at least two different power categories: one category for non-adjusted UEs and another for adjusted UEs, wherein the non-adjusted UEs use default transmission power settings for communicating with the base station, wherein the adjusted UEs use power settings that have been lowered from the default power settings in response to a power adjustment message from the base station.

7. The method of claim 1, wherein the power adjustment message causes the interfering UE to lower its transmission power by an adaptive adjustment, which varies based on dynamic conditions known to the base station, the interfering UE, or both the base station and the interfering UE.

8. The method of claim 7, wherein the adaptive adjustment is based on an Interference over Thermal (IoT) measurement.

9. The method of claim 7, wherein the adaptive adjustment is based on a reference signal received power (RSRP) difference between at least two cells.

10. The method of claim 7, wherein the adaptive adjustment is based on a resource utilization measurement.

11. A base station comprising:
at least one processor;
a non-transitory storage medium comprising computer usable program code which, when executed by the at least one processor, is operable to:
gather data of the mobile telephony network from a set of UE in range of the base station, wherein the mobile telephony network comprises at least one low-power cell having a cell range that overlaps a station range of the base station, wherein a subset of the UE transmits data to the low-power cell when within the cell range at a cell transmission power, wherein the subset of UE transmits data directly to the base station at a default station transmission power when within the station range and when outside an interference region, wherein the cell range is included within a periphery of the interference region, wherein the cell transmission power is less than the default station transmission power;
detect, using the data, that one of the user equipment (UE), referred to herein as an interfering UE is within the interference region, is outside the cell range, and that the transmissions of the interfering UE to the base station at the default station transmission power is producing high interference affecting uplink performance between a different UE and the low-power cell; and
in response to detecting, generate and convey a power adjustment message from the base station to the interfering UE, wherein the power level adjustment message causes the interfering UE to lower its transmission power from the default station transmission power to a lower power level.

12. The base station of claim 11, wherein the storage medium computer usable program code, when executed by the at least one processor, further is operable to:
detect when the interfering UE, which has previously lowered its transmission power in accordance with the adjustment message, has left a region proximate to the low-power cell; and
in response to this detection, convey a second power level adjustment message to the interfering UE, wherein the second power level adjustment message causes the interfering UE to raise its transmission power to a level equivalent to a power level of operation used by the interfering UE before the interfering UE received the power adjustment message.

13. A method for managing interference from user equipment (UE) transmissions in a mobile telephony network comprising:
gathering data at a base station of a mobile telephony network from a set of user equipment (UE) in range of the base station, wherein the mobile telephony network comprises at least one low-power cell having a cell range that overlaps a station range of the base station, wherein a subset of the user equipment (UE) transmits data to the low-power cell when within the cell range at a cell transmission power, wherein the subset of user equipment (UE) transmits data directly to the base station at a default station transmission power when within the station range and when outside an interference region, wherein the cell range is included within a periphery of the interference region, wherein the cell transmission power is less than the default station transmission power;
detecting at the base station using the data that one of the user equipment (UE), referred to as the interfering UE, is within the interference region, is outside the cell range, and is connected to, and transmitting to, the base station at the default station transmission power; and
conveying a power adjustment message from the base station to the interfering UE, wherein the power adjustment message requests the interfering UE to lower its transmission power from the default station transmission power to a lower power level.

14. The method of claim 13, wherein the lower power level is greater than the cell transmission power and is less than the default station transmission power, wherein the power adjustment message comprises a specific quantified value, wherein the lower power level is adjusted in accordance with the specific quantified value.

15. The method of claim 13, further comprising:
after the conveying of the power adjustment message and after the power level of the interfering UE has been adjusted to the lower power level, detecting at the base station that the interfering UE has moved outside the interference region and has a transmission power setting of the lower power level; and
conveying a second power adjustment message from the base station to the interfering UE, wherein the second power adjustment message requests the interfering UE to raise its transmission power from the lower power level to the default station transmission power.

16. The method of claim 13, wherein a power adjustment as specified within the power adjustment message is based on an assigned modulation and coding level, a fraction power control parameter, and a target power of a channel between the interfering UE and the base station.

17. The method of claim 13, wherein the power adjustment message causes the interfering UE to lower its transmission power by an adaptive adjustment, which varies based on dynamic conditions known to the base station, the interfering UE, or both the base station and the interfering UE.

18. The method of claim 13, wherein the power adjustment message causes the interfering UE to lower its transmission power by an adaptive adjustment, wherein the adaptive adjustment is based on at least one of an Interference over Thermal (IoT) measurement, a reference signal received power (RSRP) difference between at least two cells, and a resource utilization measurement.

19. The method of claim 13, wherein the base station maintains a power control policy for UE in range of the base station, wherein the power control policy maintains at least two different power categories: one category for non-adjusted UEs and another for adjusted UEs, wherein the non-adjusted UEs use default transmission power settings for communicating with the base station, wherein the adjusted UEs use power settings that have been lowered from the default power settings in response to a power adjustment message from the base station.

* * * * *

UNITED STATES PATENT AND TRADEMARK OFFICE
CERTIFICATE OF CORRECTION

PATENT NO. : 8,929,880 B2
APPLICATION NO. : 13/092057
DATED : January 6, 2015
INVENTOR(S) : Rapeepat Ratasuk et al.

It is certified that error appears in the above-identified patent and that said Letters Patent is hereby corrected as shown below:

IN THE SPECIFICATION

In Column 2, Line 18, delete "user equipment (EU)," and insert -- user equipment (UE), --, therefor.

In Column 9, Line 59, delete "gateway support node (GGSN)." and insert -- gateway GPRS support node (GGSN). --, therefor.

Signed and Sealed this
Twenty-first Day of June, 2016

Michelle K. Lee
*Director of the United States Patent and Trademark Office*